United States Patent
Durand et al.

(10) Patent No.: US 9,258,272 B1
(45) Date of Patent: Feb. 9, 2016

(54) STATELESS DETERMINISTIC NETWORK ADDRESS TRANSLATION

(75) Inventors: Alain Durand, Great Falls, VA (US); Reinaldo Penno, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 780 days.

(21) Appl. No.: 13/534,999

(22) Filed: Jun. 27, 2012

Related U.S. Application Data

(60) Provisional application No. 61/550,303, filed on Oct. 21, 2011.

(51) Int. Cl.
*H04L 29/12* (2006.01)
*H04L 29/06* (2006.01)

(52) U.S. Cl.
CPC ........ *H04L 61/2514* (2013.01); *H04L 61/2517* (2013.01); *H04L 63/029* (2013.01)

(58) Field of Classification Search
CPC ... H04L 61/10; H04L 61/2061; H04L 61/255; H04L 61/2517; H04L 65/1069; H04L 61/2514; H04L 63/029
See application file for complete search history.

(56) References Cited

U.S. PATENT DOCUMENTS

| | | | |
|---|---|---|---|
| 6,006,269 A | 12/1999 | Phaal | |
| 6,571,287 B1 | 5/2003 | Knight et al. | |
| 6,687,245 B2 | 2/2004 | Fangman et al. | |
| 7,058,973 B1 * | 6/2006 | Sultan ............... | H04L 29/12009 709/217 |
| 7,184,437 B1 | 2/2007 | Cole et al. | |
| 7,194,767 B1 | 3/2007 | Boydstun et al. | |
| 7,346,044 B1 | 3/2008 | Chou et al. | |
| 7,624,195 B1 | 11/2009 | Biswas et al. | |
| 8,259,571 B1 * | 9/2012 | Raphel ................ | H04L 61/2592 370/230 |
| 8,274,979 B2 | 9/2012 | Bragagnini et al. | |
| 8,458,338 B2 * | 6/2013 | Karino ............. | H04L 29/12377 709/227 |
| 8,553,542 B1 | 10/2013 | Szabo et al. | |
| 8,656,052 B2 | 2/2014 | Carothers | |
| 8,891,540 B2 | 11/2014 | Krishna et al. | |

(Continued)

FOREIGN PATENT DOCUMENTS

JP      4705656 B2    6/2011

OTHER PUBLICATIONS

Penno et al., "Stateless DS-Lite," draft-penno-softwire-sdnat-02, Mar. 11, 2012, 11 pp.

(Continued)

*Primary Examiner* — Uzma Alam
(74) *Attorney, Agent, or Firm* — Shumaker & Sieffert, P.A.

(57) ABSTRACT

Stateless deterministic network address translation (NAT) within a service provider network is described. A plurality of customer premise equipment (CPEs) positioned within customer networks and a NAT device positioned within a service provider network operate as ingress and egress for tunnels having network packets of a first network transport protocol that encapsulate inner network packets of a second network transport protocol. The NAT device stores a mapping table that maps, for each of the CPEs, a public network address of the first transport protocol to a public network address and restricted port range of the second transport protocol. The NAT device outputs control messages to communicate the respective restricted port range to each of the CPEs, and the CPEs provide network address translation within the customer networks at the ingress of the tunnels based on the restricted port range received from the NAT device of the service provider network.

19 Claims, 4 Drawing Sheets

(56) References Cited

U.S. PATENT DOCUMENTS

| | | | |
|---|---|---|---|
| 2002/0138622 A1 | 9/2002 | Dorenbosch et al. | |
| 2004/0071149 A1* | 4/2004 | Kim | H04L 29/12367 370/401 |
| 2006/0029081 A1* | 2/2006 | Yan | H04L 29/12009 370/395.52 |
| 2006/0248581 A1 | 11/2006 | Sundarrajan et al. | |
| 2007/0043876 A1 | 2/2007 | Varga et al. | |
| 2007/0162968 A1 | 7/2007 | Ferreira et al. | |
| 2008/0013524 A1 | 1/2008 | Hwang et al. | |
| 2008/0044181 A1* | 2/2008 | Sindhu | H04J 14/0227 398/49 |
| 2008/0107112 A1 | 5/2008 | Kuo et al. | |
| 2009/0109983 A1 | 4/2009 | Dixon et al. | |
| 2009/0129301 A1* | 5/2009 | Belimpasakis | H04W 28/18 370/310 |
| 2009/0135837 A1 | 5/2009 | Mohaban | |
| 2010/0008260 A1* | 1/2010 | Kim | H04L 12/4633 370/254 |
| 2010/0153560 A1 | 6/2010 | Capone et al. | |
| 2010/0175123 A1* | 7/2010 | Karino et al. | 726/12 |
| 2010/0214959 A1* | 8/2010 | Kuehnel | H04L 29/12264 370/255 |
| 2011/0047256 A1* | 2/2011 | Babu | H04L 29/12367 709/223 |
| 2011/0196945 A1 | 8/2011 | Alkhatib et al. | |
| 2011/0219123 A1 | 9/2011 | Yang et al. | |
| 2011/0249682 A1 | 10/2011 | Kean et al. | |
| 2012/0023257 A1 | 1/2012 | Vos et al. | |
| 2012/0110194 A1 | 5/2012 | Kikkawa et al. | |
| 2013/0054762 A1 | 2/2013 | Asveren | |
| 2013/0067110 A1 | 3/2013 | Sarawat et al. | |
| 2013/0091303 A1* | 4/2013 | Mitra | H04L 61/2557 709/238 |
| 2013/0103904 A1 | 4/2013 | Pangborn et al. | |
| 2013/0166763 A1 | 6/2013 | Forsback | |
| 2014/0211714 A1* | 7/2014 | Li | H04L 41/5041 370/329 |

OTHER PUBLICATIONS

Donley et al. "Deterministic Address Mapping to Reduce Logging in Carrier Grade NATs draft-donley-behave-deterministic-cgn—00" Network Working Group, Internet-Draft, IETF Trust, Sep. 26, 2011, 10 pgs.

Durand et al., "Dual-Stack Lite Broadband Deployments Following IPv4 Exhaustion," Internet Engineering Task Force (IETF), RFC 6333, Aug. 2011, 32 pp.

Postel et al., "Internet Protocol," RFC 791, Sep. 1981, 49 pp.

Deering et al., "Internet Protocol, Version 6 (IPv6) Specification," Network Working Group, RFC 2460, Dec. 1998, 39 pp.

Yamagata et al., "NAT444," Internet Engineering Task Force (IETF), Jan. 5, 2012, 10 pp.

Diel et al., "Characterizing TCP Resets in Established Connections," Computer Science Department Technical Report, Sep. 10, 2008, 10 pp.

Nilsson et al., "Fast Address Lookup for Internet Routers," Proceedings of Algorithms and Experiments, Feb. 9-11, 1998, pp. 9-18.

Penno et al., "Network Address Translation (NAT) Behavioral Updates," Internet-draft update: 4787-5382-5508, draft-penno-behave-rfc4787-5382-5508-bis-02, Nov. 16, 2011, 11 pp.

Gont, "TCP's reaction to soft errors," RFC 5461, Feb. 2009, 12 pp.

* cited by examiner

STATELESS DETERMINISTIC NETWORK ADDRESS TRANSLATION

This application claims the benefit of U.S. Provisional Patent Application 61/550,303 filed Oct. 21, 2011, the entire content of which is incorporated herein by reference.

TECHNICAL FIELD

The invention relates to computer networks and, more particularly, to access networks for mobile wireless devices.

BACKGROUND

A computer network is a collection of interconnected devices that can exchange data and share resources according to one or more communication protocols. The communication protocols define the format and manner in which the devices communicate the data. Example protocols include the Transmission Control Protocol (TCP) and the Internet Protocol (IP) that facilitate data communication by dividing the data into small blocks called packets. These packets are individually routed across the network from a source device to a destination device. The destination device extracts the data from the packets and assembles the data into its original form. Dividing the data into packets enables the source device to resend only those individual packets that may be lost during transmission. The protocols define the format and construction of the packet, including header and payload portions of the packets.

Periodically, it is necessary to transition from one communication protocol to another. This may occur, for example, when a current communication protocol used within a network is upgraded to a newer version. As one example, the Internet is currently based on a communication protocol known as Internet Protocol version 4 (IPv4). IPv4 offers a ubiquitous network service, based on datagram (connectionless) operation, and on globally significant IP addresses to aid routing. It is becoming clear that certain elements of IPv4 are insufficient to support the growth of the Internet. For example, IPv4 makes use of a 32-bit address space. Internet Protocol version 6 (IPv6), however, makes use of a much larger 128-bit address space. However, development, standardization, implementation, testing, debugging and deployment of a new communication protocol can take a very large amount of time and energy, and is not guaranteed to lead to success.

A variety of approaches may be used in an attempt to provide a smooth transition from one communication protocol to another. One example approach that has been proposed is known as "dual-stack lite," as described in "Dual-Stack Lite Broadband Deployments Following IPv4 Exhaustion" to A. Durand et al., Internet Engineering Task Force (IETF) RFC 6333, August 2011, the entire content of which is herein incorporated by reference. According to this approach, a residential gateway (also referred to herein as "customer premise equipment") located at a subscriber's premises acts as an ingress and egress for a tunnel that encapsulates IPv4 packets within IPv6 packets. These IPv4-over-IPv6 tunnels are commonly referred to as "softwires." The residential gateway forwards the IPv6 packets towards a router within a service provider network that decapsulates the IPv4 packets from the IPv6 packets. The router operates as an address family translation router (AFTR) and applies a network address translation (NAT) rule to each IPv4 packet, and forwards the IPv4 packets to the Internet. In the DS-Lite architecture, global IPv4 addresses are shared among subscribers in the AFTR, acting as a Carrier-Grade NAT (CGN) device. In this way, DS-Lite enables unmodified IPv4 application to access the IPv4 Internet over the IPv6 access network.

Service providers are often required to be able to identify a particular customer that is associated with particular network traffic. For example, service provides are typically required to maintain information such that any give network address that sourced or received certain traffic can be traced back to the particular customer. As a result, service providers typically maintain archives of NAT system log files ("syslog"). Each syslog file stores potentially a significant amount of information including the private source IP address, the private source port, any VPN information of the subscriber, tunneling information, any NAT rules/terms, public IP address and port assigned to the subscriber, and the like.

The service providers are typically required to store this information for months or years to meet law enforcement requirements. This can present significant challenges and burdens in certain environments, such as large service provider networks where session setup rate is typically very high with tens of thousands of sessions being established and torn down each day. Generating syslogs with NAT translation information in such an environment for each and every session during the setup and teardown consumes resources on the NAT device, network bandwidth and also resources on the servers storing the syslogs.

SUMMARY

In general, techniques for stateless and deterministic network address translation (NAT) are described. In one example, techniques are described in which NAT is orchestrated and controlled by the service provider network but per-flow NAT bindings are maintained on customer premise equipment (CPE), thereby being stateless for the NAT devices (e.g., address family translation routers (AFTRs) or Carrier-Grade-Nat (CGN) devices) within the service provider network. In other words, no per-session state need be maintained on the NAT devices. Because there is no per-flow state to maintain, NAT devices can implement the functionality in hardware and perform it at high speed with low latency.

Moreover, the techniques described herein are deterministic as no logs are required with respect to the NAT devices to identify which subscriber is using a public address and port. For example, in some examples the NAT devices make use of only on a per-customer mapping table that is reversible. In this case, a service provider associated with the NAT devices need not necessarily maintain NAT binding logs.

By leveraging this stateless and deterministic mode of operation, an ISP can deploy any number of NAT devices to provide redundancy and scalability at low cost. Furthermore, the techniques described herein may be backward compatible with existing techniques, such as DS-Lite. For example, a mix of conventional CPEs and stateless CPEs operating according to the techniques described herein can interoperate with a stateless NAT device.

In one example, a system comprises a plurality of customer premise equipment (CPEs) positioned within respective customer networks, and a network address translation (NAT) device positioned within a service provider network. The CPEs and the NAT device (e.g., an AFTR or CGN device) operate as ingress and egress for network tunnels having network packets that conform to a first network transport protocol that encapsulate inner network packets that conform to a second network transport protocol. The NAT device stores a mapping table that maps, for each of the CPEs, a public network address of the first transport protocol to a public network address and restricted port range of the second transport protocol. The NAT device outputs a control message to communicate the respective restricted port range to each of the CPEs, and each of the CPEs provide network address translation within the respective customer network based on the restricted port range received from the NAT device of the service provider network.

In another example, a network address translation device comprises a plurality of interfaces to communicate subscriber packets with a plurality of customer premise equipment (CPEs) positioned within respective customer networks. A computer-readable storage medium stores a mapping table that maps, for each of the CPEs, a public network address of a first transport protocol to a public network address and restricted port range of a second transport protocol. The NAT device further includes program code to execute on a processor of the NAT device to output control messages to the CPEs to communicate the respective restricted port range to each of the CPEs for locally performing NAT within the customer networks, wherein the NAT device stores the mapping table without storing any per-session NAT bindings for communication sessions from the CPEs.

In another example embodiment, a method comprises operating a NAT device of a service provider network as an ingress and egress for tunneling subscriber traffic through the service provider network to a plurality of CPEs positioned within respective customer networks, wherein the subscriber data traffic is tunneled as network packets that conform to a first network transport protocol and that encapsulate inner network packets that conform to a second network transport protocol. The method further comprises storing a mapping table within the NAT device, wherein the mapping table maps, for each of the CPEs, a public network address of the first transport protocol to a public network address and restricted port range of the first transport protocol without storing any per-session NAT bindings on the NAT device for communication sessions from the CPEs. The method further comprises outputting a control message to communicate the respective restricted port range to each of the CPEs for providing local network address translation within the respective customer network based on the restricted port range.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
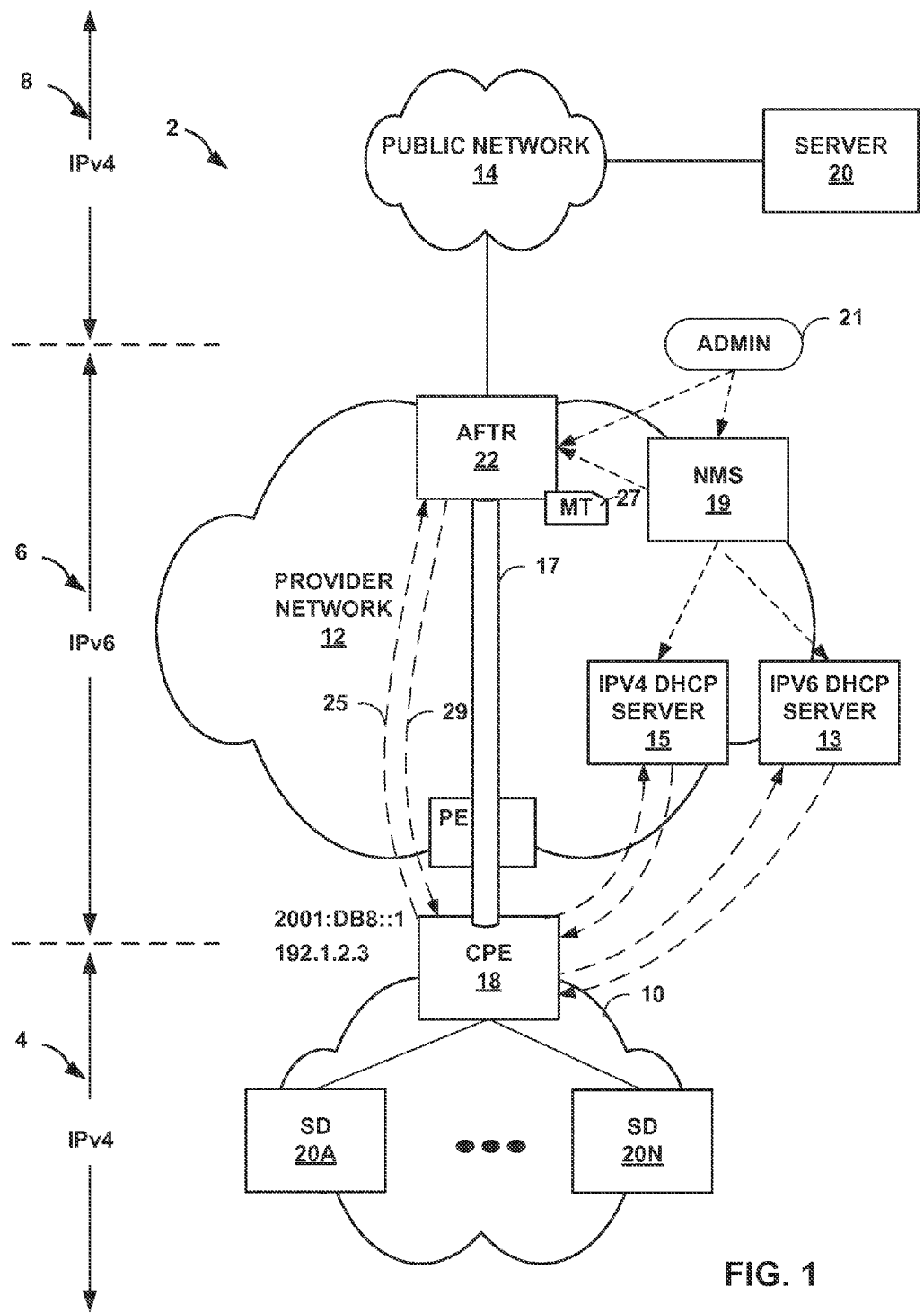
FIG. 1 is a block diagram illustrating an exemplary network system that implements the network address translation techniques described in this disclosure.

FIG. 1 is a block diagram illustrating an example network system 2 that implements the network address translation techniques described in this disclosure. As shown in FIG. 1, network system 2 includes subscriber network 10, service provider network 12 and public network 14. In the example of FIG. 1, service provider network 12 operates as a private network that provides packet-based network access to a customer having customer-premises equipment (CPE) 18 that services one or more subscriber devices (SD) 20A-20N (collectively, "subscriber devices 20") for that customer. Each network within network system 2 may operate in accordance with one or more network-layer protocol (i.e., layer three of the OSI model). As illustrated in FIG. 1, different segments of network system 2 operate in accordance with different network-layer protocols. For example, network segments 4 and 8 operate in accordance with Internet Protocol version 4 (IPv4) as described in RFC 791, entitled "Internet Protocol" to Jon Postel et al., September 1981, the entire content of which is incorporated herein by reference. As another example, network segment 6 operates in accordance with Internet Protocol version 6 (IPv6) as described in request for comments (RFC) 2460, entitled "Internet Protocol, Version 6 (IPv6) Specification" to S. Deering et al., December 1998, the entire content of which is incorporated herein by reference.

As illustrated in FIG. 1, subscriber network 10 and public network 14 send and receive network messages in accordance with IPv4. Provider network 12 sends and receives network messages in accordance with IPv6. While described as implementing IPv6, provider network 12 may also implement IPv4 or a combination of IPv4 and IPv6. Similarly, although described as implementing IPv4, subscriber network 10 and public network 14 may also implement IPv6 or a combination of IPv4 and IPv6.

Subscriber network 10 typically includes CPE 18 and one or more subscriber devices 20. CPE 18 may be a residential gateway by which the subscriber devices 20 connect to provider network 12 and thereby access public network 14. CPE 18 typically comprises a wireless router or other home networking device, such as a hub, a switch, a router, a cable modem, a digital subscriber line (DSL) modem or any other device that provides access or otherwise connects subscriber devices 20 to public network 14 or other wide area network (WAN). Typically, subscriber devices 20 are connected to CPE 18 via wired or wireless network protocols, such as Ethernet or 802.11g. Examples of subscriber devices 20 include personal computers, laptop computers, workstations, tablet computers, personal digital assistants (PDAs), wireless device, network-ready appliances, and the like.

Provider network 12 may represent a private network that is owned and operated by an Internet service provider (ISP) to provide network access to one or more subscriber devices 20. As a result, provider network 12 may be referred to herein as a service provider (SP) network. Provider network 12 may connect to one or more customer networks (e.g., subscriber network 10). While the example network system 2 illustrated in FIG. 1 includes one provider network 12, other examples may include multiple provider networks 12.

Address Family Translation Router (AFTR) 22 of provider network 12 provides connectivity to public network 14. Public network 14 may comprise any set of one or more interconnected public networks, such as the Internet. Public network 14 may include other conventional network devices, such as routers, media gateways, switches, hubs, and network accelerators, to communicate data between subscriber devices 20 and network resources, such as server 20. Server 20 represents any device that provides one or more network resources accessible to subscriber devices 20. For example, server 20 may include email servers, domain controllers, web servers, print servers, printers, network copiers, gateways, intelligent switches, hubs, routers or other network access points or devices. AFTR 22 may comprise a layer two (L2) switch, a layer three (L3) router or another type of network device that facilitates the transfer of data within network system 2. In some examples, AFTR 22 may also perform bridging functions, firewall functions, intrusion detection functions, security functions, or other network functions. Further, although shown and described as providing L3 services, AFTR 22 may be any network element that provides services for other layers of the network stack. As one example, AFTR 22 may be a network router that integrates L2 and L3 services so as to provide L2 forwarding services as well as L3 routing functions. As shown in the example of FIG. 1, AFTR 22 is connected to provider network 12 and public network 14 and exchanges data between provider network 12 and public network 14.

CPE 18 and AFTR 22 are configured to tunnel packets through provider network 12, allowing the service provider to take advantage of IPv6 while supporting IPv4 customers and IPv4 Internet connectivity. CPE 18 located at a subscriber's premises acts as an ingress and egress for tunnel 17 that encapsulates IPv4 packets within IPv6 packets. That is, the IPv6 packets may be configured in accordance with a transitioning protocol, such as dual-stack lite (ds-lite) and may encapsulate IPv4 packets. In this case, IPv4-over-IPv6 tunnel 17 is commonly referred to as an "IPv4-in-IPv6 softwire" or "softwire" for short. According to the example of FIG. 1, CPE 18 is assigned both a public IPv6 network address and a public IPv4 address, and subscriber devices 20 are assigned private (e.g., not globally unique) IPv4 network addresses.

When implementing the ds-lite approach, CPE 17 and AFTR 22 cooperate to perform both tunneling functionality as well as network address translation functionality. That is, AFTR 22 controls CPE 18 to provide restricted NAT locally within subscriber network 10, thereby implementing network address translation for the inbound and outbound packets in a manner that is deterministic and stateless for AFTR 22. For example, as described in further detail below, AFTR 22 need not store per-flow state data for subscriber devices 20. Moreover, the techniques allow AFTR 22 and CPE 18 to implement NAT in a manner that is deterministic so no log files need be maintained within provider network 12.

For example, CPE 18 is assigned an IPv6 (e.g., 2001:DB8::1) for use in tunneling traffic via tunnel 17 to AFTR 22. This may be assigned, for example, by IPv6 DHCP server 13. At this time, CPE 18 is also assigned a public IPv4 address (e.g., 192.1.2.3) for use within public network 13. For example, IPV6 DHCP server 13 may provide CPE 18 with an address of IPv4 DHCP server 15, which in turn may assign the IPv4 public address to CPE 18.

In addition, CPE 18 and AFTR 22 communicate to configure the CPE to locally provide NAT functions prior to tunneling network packets via tunnel 17. For example, AFTR 22 is configured with a per-subscriber mapping table 27 that maps the IPv6 address of CPE 18 of a subscriber to the public IPv4 address and a specific port range provisioned for that subscriber. In the example of FIG. 1, mapping table 27 may map IPv6 address 2001:DB8::1 provisioned for CPE 18 to public IPv4 address 192.1.2.3 and a specific port range of 1000-1999. At startup, and periodically thereafter, CPE 18 outputs a message 25 to effectively request a restricted port range from AFTR 22. In one example, CPE 18 outputs message 25 as an outbound tunneled packet with an invalid source port, such as port zero, which triggers AFTR 22 to output reply message 29. That is, in response, AFTR 22 outputs a reply message 29 that specifies the restricted port range, e.g., 1000-1999, assigned by the service provider to that CPE for use with its subscriber devices 20. In one example, AFTR 22 utilizes the Internet Control Message Protocol (ICMP) as a mechanism for conveying the restricted port information to CPE 18. ICMP is typically used by devices to send error messages. However, in accordance with the examples described herein, AFTR 22 outputs a "source restricted" ICMP message that specifies a lowest port and a highest port allocated for CPE 18 so as to restrict the CPE to that port range of a transport protocol associated with an IPv4 address. In this example, CPE 18 transmits request 25 as a packet with a source port outside of the pre-authorized range. Upstream AFTR 22 will drop the packet and use the ICMP message defined here to inform the CPE of the actual port range allocated. Thereafter, CPE 18 provides local NAT within subscriber network 10 at the ingress of tunnel 17 based on the address information assigned by DHCP servers 13, 15 and the NAT configuration information received from AFTR 22, e.g., the restricted port range, via the ICMP port restricted message. CPE 18 and AFTR 22 may repeat this process to communicate restricted port range information for each transport protocol, such as TCP and UDP. Although explained with respect to ICMP, other types of message formats can be used to convey the restricted port range to CPE 18, such as DHCP.

For example, when subscriber device 18A generates a packet directed to server 20 of public network 14, subscriber device 18A outputs an IPv4 packet having a private IPv4 source address that corresponds to subscriber device 18A and a public IPv4 destination address that corresponds to server 20. The IPv4 packet is sent from subscriber device 18A to CPE 18. Prior to encapsulating the IPv4 packet within an IPv6 packet, CPE 18 performs NAT on the IPv4 packet by applying a source network address and port translation (NAPT) binding that maps the private IPv4 source address and port of the outbound packet to the public IPv4 address and a port selected from the restricted port range designed by AFTR 22. During this process, CPE device 22 may replace all or a portion of a header (e.g., IP or UDP header) of the IPv4 packet prior to encapsulating and forwarding the packet to AFTR 22. Next, CPE 18 encapsulates the IPv4 packet within an IPv6 packet and forwards the packet to AFTR 22 via provider network 16. When encapsulating the IPv4 packet inside the IPv6 packet, CPE 18 includes its IPv6 address as the source address and an IPv6 destination address that corresponds to AFTR 22. In this manner, CPE 18 tunnels the IPv4 packet across an IPv6 network (e.g., provider network 12) using a softwire. In some embodiments, CPE 18 need not first establish a tunnel with AFTR 22 using signaling or other techniques. Rather, the softwire between CPE 18 and AFTR 22 may be automatically established when CPE 18 sends the IPv6 packet to AFTR 22. Upon receiving the IPv6 packet, AFTR 22 decapsulates the IPv4 packet from the IPv6 packet and then forwards the packet to server 20 via public network 14.

When AFTR 22 receives an inbound IPv4 packet from public network 14 (e.g., from server 20), AFTR 22 encapsulate the IPv4 packet within an IPv6 packet having an IPv6 destination address of CPE 18 and an IPv6 source address of AFTR 22. CPE 18 receives the IPv6 packet from AFTR 22 via provider network 12 and decapsulates the IPv4 packet from the IPv6 packet. CPE 18 then performs reverse NAPT. That is, CPE 18 identifies a current NAT entry for the communication session and maps the public IPv4 destination network address and the destination port within the IPv4 packet to the corresponding IPv4 private network address and port for a particular subscriber device 20 as specified by the binding. CPE 18 may then replace all or a portion of a header (e.g., IP or UDP header) within the packet and forwards the translated packet to subscriber device 18A.

In this way, network address translation is orchestrated and controlled by service provider network 12, but per-flow NAT bindings are maintained on CPE 18 to associate each specific packet flow with a subscriber private IPv4 address and a port. As such, the techniques are stateless for AFTR 18 within service provider network 12. In other words, no per-session state need be maintained on AFTR 18, with only a per-subscriber mapping table 27 being configured. Because there is no per-flow state to maintain, AFTR 18 can implement the functionality in hardware, if necessary, and perform it at high speed with low latency.

Moreover, the techniques described herein are deterministic as no logs are required on AFTR 18 to identify which customer network 10 is using a public address and port. For example, per-subscriber mapping table 27 is reversible in that a customer identity may readily be determined based on the address and port range configuration established by the service provider. In this case, a service provider associated with the AFTR need not need necessarily maintain extensive NAT binding logs that records NATP bindings for each session.

In addition, techniques allow a service provider a greater flexibility on how their pool of IPv4 addresses is managed and also provide greater freedom on allocation of IPv6 addresses. For example, an administrator 21 or network management system (NMS) 19, for example, may freely configure DHCP servers 13, 15 to control allocation of IPv6 and IPv4 addresses, respectively, within service provider network 22. AFTR 22 need only be configured with the mapping between IPv6 address and public IPv4 address and subscriber-specific port range based on the particular technique chosen by the service provider.

As such, sequential or pre-defined mathematical allocation is no longer a pre-requisite for achieving deterministic NAT. Because the association between IPv6 address and IPv4 address and port range need not be tied to a mathematical formula, the service provider maintains all flexibility to independently allocate IPv6 address and IPv4 addresses. For example, IPv6 addresses do not have to be allocated sequentially and IPv4 resources can be modified freely.

Figure 2:
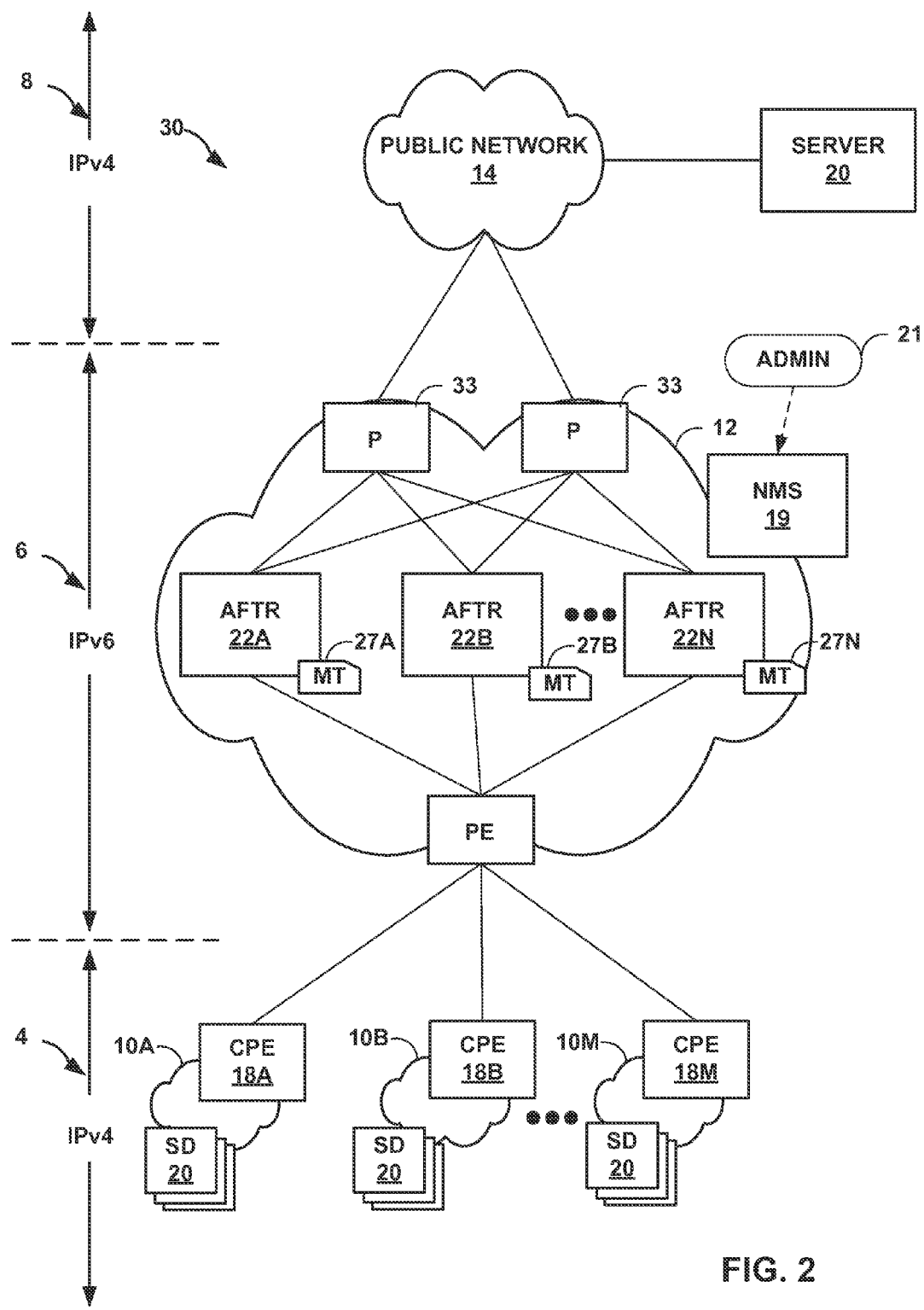
FIG. 2 is a block diagram illustrating another example network system that implements the network address translation techniques in this disclosure.

FIG. 2 is a block diagram illustrating another example network system 30 that implements the network address translation techniques described above with respect to FIG. 1. In particular, FIG. 2 shows a more complex network system 30 in which service provider network 12 provides packet-based network access to customers having customer networks 10A-10M. As shown, each of customer networks 10 has a corresponding customer-premises equipment (CPE) 18 that services one or more subscriber devices 20 for that customer.

In the example of FIG. 2, service provider network 12 includes a cluster of AFTRs 22A-22M that are configured to provide routing and NAPT functions for customer networks 10 in a highly scalable manner. In this example, CPEs 18 and AFTRs 22 are configured in the manner described with respect to FIG. 1 to tunnel packets through provider network 12 to allow the service provider to utilize IPv6 infrastructure while supporting IPv4 clients and IPv4 Internet connectivity. CPEs 18 and AFTRs operate, for example, as ingresses and egresses for IPv6 tunnels, not shown in FIG. 2. For example, each of AFTRs 22 may be configured with the same IPv6 address on the interface facing CPEs 18, with one of the AFTRs being designated as the master and the remaining AFTRs operating as backup devices. Administrator 21, either directly or by way of network management system (NMS), 19 may install an IPv6 anycast route within service provider network 6 for use by CPEs 18 in reaching AFTRs 22 via the IPv6 address assigned to the AFTRs. Each of AFTRs 22 may be configured to with the same mapping table 27 and with access to the same IPv4 pool from which to select public IPv4 addresses and restricted port ranges for each CPE 18. Further, routes to the pool global IPv4 addresses configured on the stateless AFTRs 22 may be anycasted by the relevant AFTRs within the ISP routing domain and, therefore, reachable by provider routers 33.

Each CPE 18 outputs a message to request a restricted port range. In response to each request, the master AFTR 22 outputs a reply message that specifies the restricted port range assigned by the service provider to that particular one of CPEs 18 for use with its subscriber devices 20. Alternatively, the master AFTR 22 may output the message in response to receiving an encapsulated IPv4 packet having source ports that do not comply with the restricted port range to be used for local NAT operations by the given CPE 18. Thereafter, each CPE 18 provides local NAT within its corresponding subscriber network based on the address the NAT configuration information received from the master AFTR 22, e.g., the restricted port range. Upon failure of the master AFTR 22, one of the backup AFTRs is selected as the new master and connectivity between public network 14 and customer networks 10 is maintained without interruption. In this way, the service provider may can deploy AFTRs 22 to apply stateless and deterministic network address translation to provide redundancy and scalability at low cost.

Per-subscriber mapping table 27 can be constructed and deployed to AFTRs 22 in various ways. For example, mapping table 27 can be a static file that is replicated out-of-band on the AFTRs. Alternatively, each AFTR 22 can construct mapping table 27 based on a formula or pre-defined algorithm. As another example, each AFTR 22 can be dynamically build its instance of mapping table 27 using authentication (e.g., radius) queries to a subscriber database or AAA server. The query may be triggered, for example, upon reception by an AFTR 22 of a first outbound IPv4 over IPv6 packet or a first inbound IPv4 packet.

Although described with respect to "dual-stack lite" and use IPv4-over-IPv6 tunnels, the techniques may be employed with other network models in which both IPv4 and IPv6 protocols are supported. For example, the techniques may be used with "NAT444" with Carrier Grade NAT (CGN). In this example, AFTRs 22 of FIG. 2 may be CGN devices and each CGN device may be provided a mapping table that maps a private IPv4 address for each CPE 18 to a public IPv4 and restricted port range for the CPE. Administrator 21 or NMS 19 may install an IPv4 anycast route within service provider network 6 for use by CPEs 18 in reaching the CGNs. Each of CGN may be configured to with the same mapping table 27 and with access to the same IPv4 pool from which to select public IPv4 addresses and restricted port ranges for each CPE 18. Each CPE 18 may outputs a message to request a restricted port range using the default IPv4 address for the anycast route. In response to each request, the master CGN outputs a reply message that specifies the restricted port range assigned by the service provider to that particular one of CPEs 18 for use with its subscriber devices 20. Thereafter, each CPE 18 provides local NAT within its corresponding subscriber network based on the address the NAT configuration information received from the master AFTR 22, e.g., the restricted port range. Further exemplary details of NAT444 are described in Yamagata, "NAT444", Version 5, Internet Engineering Task Force, Jan. 5, 2012, the entire contents of which are incorporated herein by reference.

Figures 3, 4:
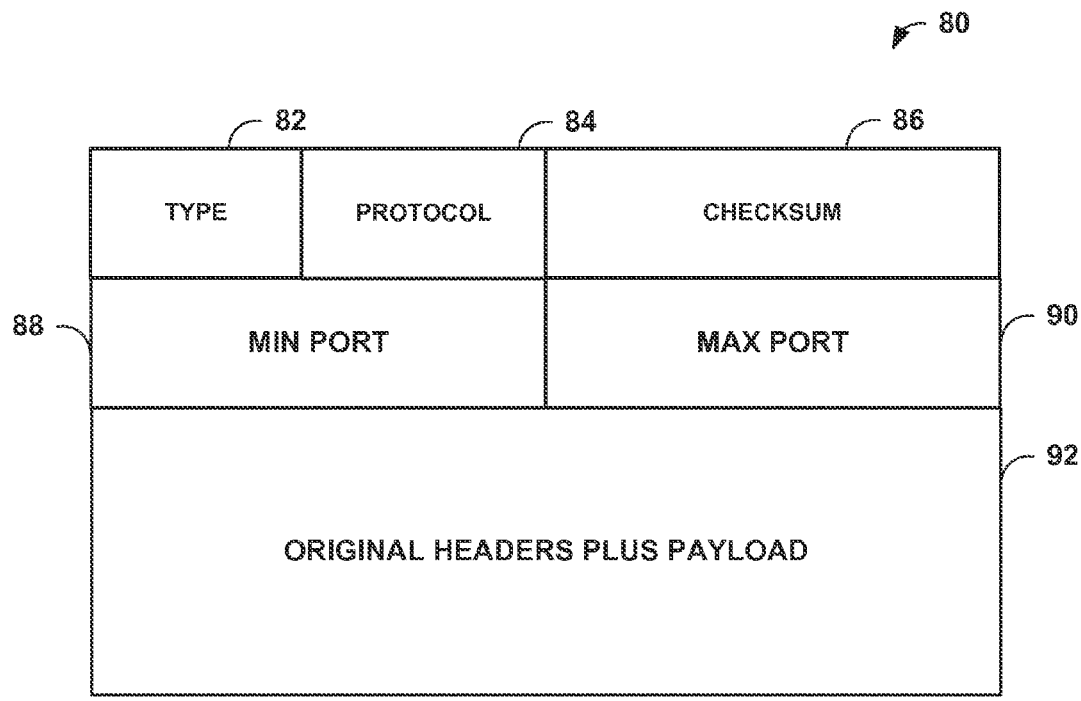
FIG. 3 illustrates an example per-subscriber mapping table.
FIG. 4 illustrates an example format for an ICMP message for communicating a restricted port range to a subscriber CPE.

FIG. 3 illustrates an example per-subscriber mapping table 70 for use within systems 10, 30 of FIGS. 1-2. In this simplified example, mapping table 70 includes a single entry for each CPEs 18. In this example, mapping table 70 includes three entries listing three different IPv6 addresses 72 for different customers. Mapping table 70 maps each of the IPv6 addresses 72 for the CPEs to a corresponding public IPv4 address 74 and a specific port range 76 provisioned for that CPE. In the example of FIG. 3, mapping table 27 may map IPv6 address 2001:DB8::1 of CPE 18 to public IPv4 address 192.1.2.3 and a specific port range of 1000-1999. In this example, the remaining two IPv6 addresses of mapping table 70 are mapped to different restricted port ranges 76 but are able to reuse the same public IPv4 address 192.1.2.3.

FIG. 4 illustrates an example format for an ICMP message 80 for communicated a restricted port range to a CPE, such as any of CPEs 18 discussed herein. In this example, ICMP message 80 includes an 8-bit type 82 that identifies the ICMP message as "restricted port" type. Next, the ICMP header includes an 8-bit code 84 that, in this example, is used to specify the transport protocol with which the restricted port range is associated. For example, a code value of "6" may be used to indicate that the restricted port range being conveyed is for the transport control protocol (TCP). As another example, a code value of "17" may be used to indicate that the restricted port range being conveyed is for the user datagram protocol (UDP). Checksum 86 is used for error checking and, in one example, is the 16-bit one's complement of the one's complement sum of ICMP message 80 starting with ICMP Type 82. For, computing checksum, the checksum field 86 should be zero.

MIN PORT field 88 and MAX PORT field 90 specify a maximum and minimum port that can be used, respectively, by the receiving CPE. Finally, field 92 is a variable length field that may be used to contain the original headers and payload of any outbound packet from CPE 18 that caused AFTR 22 to produce the "port restricted" ICMP message on the interface of the AFTR to which the CPE is connected. In one example, field 92 may contain the original IPv6 header plus up to 64 bytes of the payload including the IPv4 header, the transport header and the original payload of the outbound packet that caused AFTR 22 to produce the ICMP message.

Figure 5:
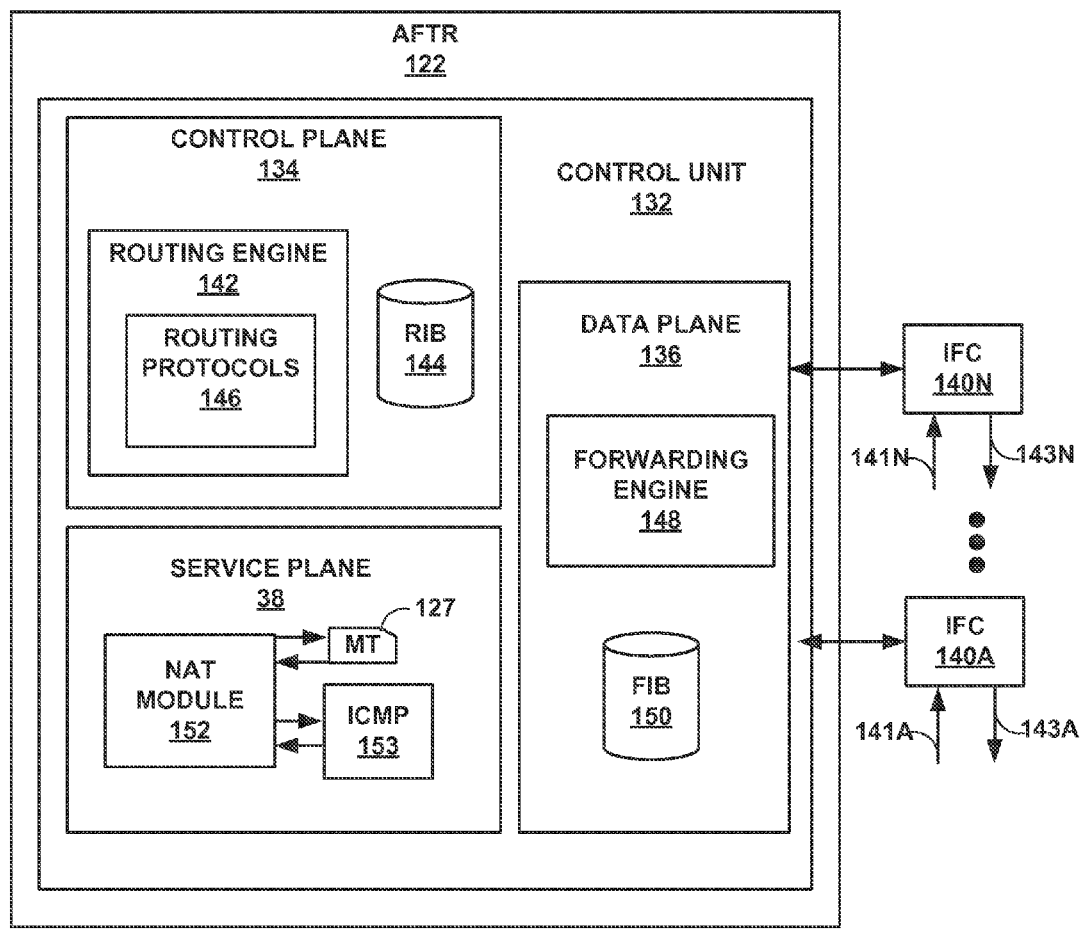
FIG. 5 illustrates an example network device that may implement the techniques of this disclosure.

FIG. 5 is a block diagram illustrating an example AFTR 122 that may implement the techniques of this disclosure. For purposes of illustration, AFTR 122 may be described below within the context of the example network systems 2, 30 of FIGS. 1-2 and may represent AFTR 22. In this example embodiment, AFTR 122 includes control unit 132 and interface cards (IFCs) 140A-140N (collectively, "IFCs 140") that send and receive packet flows or network traffic via inbound network links 141A-141N (collectively, "inbound links 141") and outbound network links 143A-143N (collectively, "outbound links 143"). AFTR 122 typically include a chassis (not shown in the example of FIG. 6) having a number of slots for receiving a set of cards, including IFCs 140. Each card may be inserted into a corresponding slot of a chassis for communicably coupling the card to a control unit 132 via a bus, backplane, or other electrical communication mechanism. IFCs 140 are typically coupled to network links 141 via a number of interface ports (not shown), and send and receive transient network traffic as well control messages to and from control unit 132.

Control unit 132 may include one or more processors that execute software instructions, such as those used to define a software or computer program, stored to a computer-readable storage medium, such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 132 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 132 may also be divided into three logical or physical "planes" to include a first control or routing plane 134, a second data or forwarding plane 136, and a third service plane 138. That is, control unit 132 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations.

A high-speed switch couples control plane 134, service plane 28 and, IFCs 140 to deliver data units and control messages among the elements. The switch may comprise an internal switch fabric or cross-bar, bus, or link, or combination thereof. Examples of high-speed multi-stage switch fabrics used as a forwarding plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference. In some implementations, control plane 134 may logically implement service plane 138 in that service plane 138 is provided as a virtual service plane executing within control plane 134. In this respect, NAT module 152 may execute within either service plane 138 when a dedicated service plane 138 is implemented or within control plane 134 when service plane 138 executes as a virtualized service plane 138 in a virtual environment provided by control plane 134.

Control plane 134 of control unit 132 may provide the routing functionality of AFTR 122. In this respect, control plane 134 may represent hardware or a combination of hardware and software of control unit 132 that implements routing protocols 146 by which routing information stored within routing information base (RIB) 44 may be determined. The routing information may include information defining a topology of a network, such provider network 12. Control plane 134 may resolve the topology defined by the routing information to select or determine one or more routes through provider network 12. Control plane 134 may then update data plane 136 with these routes, where data plane 36 maintains these routes as forwarding information stored within forwarding information base (FIB) 50. Forwarding or data plane 136 may include forwarding engine 48, which may be implemented in hardware or a combination of hardware and software of control unit 132 that forwards network traffic in accordance with the forwarding information. Service plane 138 may represent hardware or a combination of hardware and software of control unit 132 responsible for providing and managing one or more services, such as a NAT service. RIB 144 and FIB 150 may each be stored in the form of one or more tables, databases, linked lists, radix trees, or other suitable data structure.

Service plane 138 provides an operating environment for executing service-related program code, including NAT module 152 and ICMP 153. For example, forwarding engine 148 may direct certain types of packets to service plane 138 for processing prior to forwarding the packet in accordance with FIB 150. For example, FIB 150 may specify that certain packets needs to be forwarded to a "next-hop" of a logical interface that corresponds to service plane 38. When a packet is received from CPE 18 and configured in accordance with the ds-lite approach, for example, the packet is structured as an IPv6 tunnel packet and includes an IPv6 source address that is set to the IPv6 address of CPE 18 and an IPv6 destination address that is set to the IPv6 address of AFTR 22. As such, forwarding engine 148 forwards the IPv4 over IPv6 traffic to service plane 38 for processing by NAT module 152, which in turns provides ingress and egress operations as well as the stateless, deterministic NAT operations described herein.

For example, when processing an outbound IPv4 over IPv6 packet, NAT module 152 accesses per-subscriber mapping table 127 and verifies that the outer IPv6 source address is a valid address that is currently assigned to a CPE device 18. If not, tunnel module 162 drops the IPv6 packet. Otherwise, NAT module 152 removes the outer IPv6 header to decapsulate the inner IPv4 packet for further processing by NAT module 152. NAT module 152 then verifies that the inner IPv4 source address matches an entry in mapping table 127. If not, NAT module 152 drops the packet and invokes ICMP 153 to send back an ICMP "administratively prohibited" message. Otherwise, if the inner IPv4 source address matches an entry, NAT module 152 confirms that the inner IPv4 packet already NATed by CPE 18 complies with the port restrictions specified by per-subscriber mapping table 127 for the specific transport protocol being used. In the event the outbound IPv4 packet contains a source port number that violates the port restrictions for a given CPE, NAT module 152 drops the packet and invokes ICMP 153 to send back an ICMP "port restricted" message to the IPv6 source address of the packet. That is, NAT module 152 constructs the ICMP "port restricted" message to set field 92 with the original IPv6 headers and payload of the IPv6 packet that violated the port restrictions.

Similarly, NAT module 152 provides ingress functions for inbound IPv4 packets destined for CPE 22. For example, NAT module verifies that inbound IPv4 packets received from public network 14 have destination IPv4 addresses that match an entry within mapping table 127 and have destination ports that fall within the restricted port range. NAT module 152 drops any inbound IPv4 packets outside of the IPv4 address and prot range entries within mapping table 127.

Various embodiments of the invention have been described. Further exemplary details are described in "Stateless DS-Lite" to R. Penno et al., Internet Engineering Task Force (IETF), Mar. 11, 2012, the entire content of which is herein incorporated by reference. These and other embodiments are within the scope of the following claims.

The invention claimed is:

1. A system comprising:
a plurality of customer premise equipment (CPEs) positioned within respective customer networks, each of the customer networks having subscriber devices coupled to the respective CPE of the customer network; and
a network address translation (NAT) device positioned within a service provider network, wherein the CPEs and the NAT device operate as ingress and egress for network tunnels having network packets that conform to a first network transport protocol that encapsulate network packets from the subscriber devices that conform to a second network transport protocol,
wherein the NAT device stores a mapping table that maps, for each of the CPEs, a public network address of the first transport protocol to a public network address and a restricted port range of the second transport protocol,
wherein the NAT device outputs a control message to communicate the respective restricted port range to each of the CPEs, and
wherein each of the CPEs performs network address translation on the network packets from the subscriber devices within the respective customer network based on the restricted port range received from the NAT device of the service provider network by translating between private network addresses of the subscriber devices and the public network address and ports within the restricted port range communicated to the CPE by the NAT device.

2. The system of claim 1, wherein the NAT device stores the mapping table having a single entry for each CPE without storing any per-session NAT binding for each communication session from the CPEs.

3. The system of claim 1, wherein each of the CPEs perform network address translation by, upon receiving a packet of a new packet flow from a subscriber device, dynamically selecting a port within the restricted port range received from the NAT device, and storing a per-session NAT binding that maps a private network address for the subscriber device to the public network address and the selected port.

4. The system of claim 1, wherein the control message comprises an error message output by the NAT device in the form of an Internet Control Message Protocol (ICMP) message.

5. The system of claim 1, wherein the NAT device outputs the control message to one of the CPEs in response to receiving an outbound packet from the CPE that violates the restricted port range for the CPE.

6. The system of claim 1, wherein the NAT device constructs the control message to specify a transport protocol with which the restricted port range is associated.

7. The system of claim 1, wherein the first transport protocol comprises IPv6 and the second transport protocol comprises IPv4.

8. The system of claim 1,
wherein the NAT device is one of a plurality of NAT devices within the service provider network,
wherein each of the NAT devices is configured with the network address and the same mapping table that maps, for each of the CPEs, the public network address of the first transport protocol to the public network address and restricted port range of the second transport protocol, and
wherein the CPE communicates the network packets with any of the NAT devices.

9. A network address translation (NAT) device comprising:
a plurality of interfaces to communicate subscriber packets with a plurality of customer premise equipment (CPEs) positioned within respective customer networks, each of the customer networks have subscriber devices coupled to the respective CPE;
a computer-readable storage device to store a mapping table that maps, for each of the CPEs, a public network address of a first transport protocol to a public network address and restricted port range of a second transport protocol, and
program code to execute on a processor of the NAT device to output control messages to the CPEs to communicate the respective restricted port range to each of the CPEs for locally performing NAT on network packets from the subscriber devices within the customer networks by translating between private network addresses of the subscriber devices and the public network address and ports within the restricted port range communicated to the CPE by the NAT device, wherein the NAT device stores the mapping table without storing any per-session NAT bindings for communication sessions from the CPEs.

10. The NAT device of claim 9, wherein the control message comprises an error message output by the NAT device in the form of an Internet Control Message Protocol (ICMP) message.

11. The NAT device of claim 9, wherein the first transport protocol comprises IPv6 and the second transport protocol comprises IPv4.

12. A method comprising:
operating a network address translation (NAT) device of a service provider network as an ingress and egress for tunneling subscriber data traffic through the service provider network to a plurality of customer premise equipment (CPEs) positioned within respective customer networks, wherein each of the customer networks comprise subscriber devices coupled to the respective CPE of the customer network, and wherein the subscriber data traffic is tunneled as network packets that conform to a first network transport protocol and that encapsulate network packets from the subscriber devices that conform to a second network transport protocol;

storing a mapping table within the NAT device, wherein the mapping table maps, for each of the CPEs, a public network address of the first transport protocol to a public network address and restricted port range of the first transport protocol without storing any per-session NAT bindings on the NAT device for communication sessions from the CPEs; and outputting a control message to communicate the respective restricted port range to each of the CPEs for performing local network address translation within the respective customer network based on the restricted port range by translating between private network addresses of the subscriber devices and the public network address and ports within the restricted port range communicated to the CPE by the NAT device.

13. The method of claim 12, wherein the control message comprises an error message output by the NAT device in the form of an Internet Control Message Protocol (ICMP) message.

14. The method of claim 12, wherein outputting the control message comprises outputting the control message from the NAT device to one of the CPEs in response to receiving from the CPE an outbound packet that violates the restricted port range specified within the mapping table for that CPE.

15. The method of claim 12, further comprising constructing the control message to specify a transport protocol with which the restricted port range is associated.

16. The method of claim 12, wherein the first transport protocol comprises IPv6 and the second transport protocol comprises IPv4.

17. The method of claim 12, further comprising:
upon receiving a packet of a new packet flow of the subscriber data traffic from a subscriber device with one of the CPEs, dynamically selecting a port within the restricted port range received from the NAT device and storing a per-session NAT binding within the CPE that maps a private network address for the subscriber device to the public network address of the second transport protocol and the selected port;

performing, with the CPE device, network address translation on the packet for the packet flow based on the NAT binding to form a translated packet;

encapsulating the translated packet to form a tunnel packet in accordance with the first transport protocol; and forwarding the tunnel packet to the NAT device.

18. The method of claim 12, further comprising
configuring a plurality of other NAT devices within the service provider network with a same mapping table that maps, for each of the CPEs, the public network address of the first transport protocol to the public network address and restricted port range of the second transport protocol, and communicating the subscriber data traffic for any of the CPE between that CPE and any of the NAT devices.

19. A residential gateway device comprising:
a network interface to communicate subscriber packets with a network address translation (NAT) device positioned within service provider network, wherein the residential gateway device is positioned within a customer network having a plurality of subscriber devices, and wherein the network interface is assigned a public network address of a first transport protocol and a public network address of a second transport protocol for tunneling the subscriber packets through the service provider network to the NAT device;

program code executing on a processor of the residential gateway device to receive an error message output by the NAT device in the form of an Internet Control Message Protocol (ICMP) message, wherein the ICMP message encodes a restricted port range for the second transport protocol, and program code executing on the processor to locally perform NAT on the subscriber packets in accordance with the restricted port range prior to tunneling the subscriber packets to the NAT device by translating between private network addresses and ports of the subscriber packets and the public network address of the first transport protocol and the ports within the restricted port range communicated to the residential gateway by the NAT device.

* * * * *